C. VOGT.
DRINK MIXER.
APPLICATION FILED AUG. 22, 1919.
1,323,506.
Patented Dec. 2, 1919.
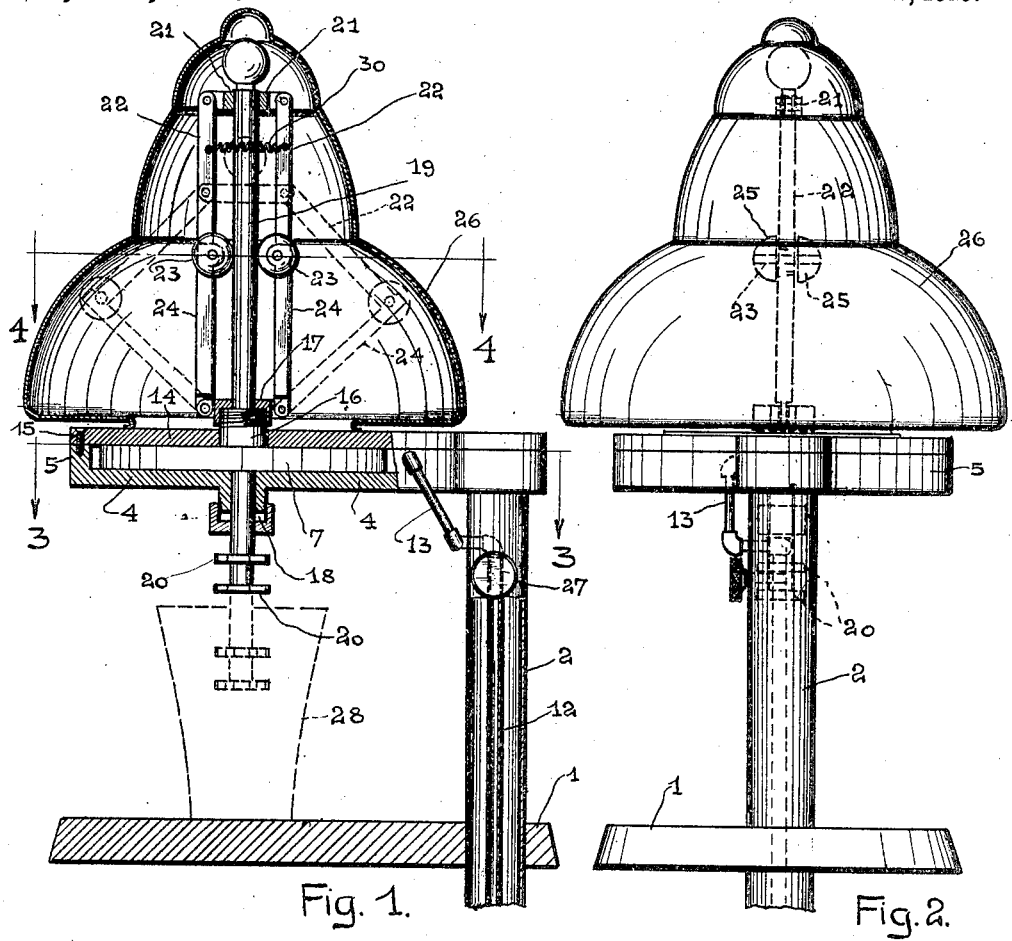
Fig. 1.
Fig. 2.
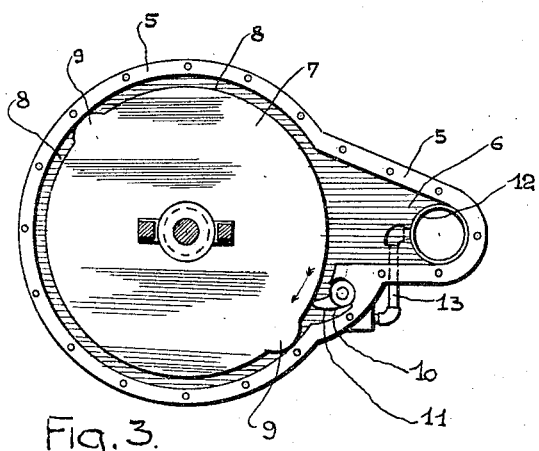
Fig. 3.
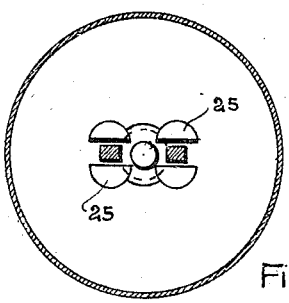
Fig. 4.
INVENTOR
Chas. Vogt
BY Munn &Co.
ATTORNEYS.

UNITED STATES PATENT OFFICE.

CHARLES VOGT, OF CHICAGO, ILLINOIS.

DRINK-MIXER.

1,323,506.  Specification of Letters Patent.  Patented Dec. 2, 1919.

Application filed August 22, 1919. Serial No. 319,167.

*To all whom it may concern:*

Be it known that I, CHARLES VOGT, a citizen of the United States, and a resident of the city of Chicago, in the county of Cook and State of Illinois, have invented a new and useful Improvement in Drink-Mixers, of which the following is a full, clear, and exact description.

My invention relates to improvements in mechanical drink mixers, and it consists in the combinations, constructions and arrangements herein described and claimed.

An object of my invention is to provide a device, by means of which a mixing of drinks, such as soft drinks, may be readily accomplished with a minimum of effort and attention on the part of the operator.

A further object of my invention is to provide a device which is adapted to be actuated by water power, and which therefore is available for use in any community having water pressure.

A further object of my invention is to provide a drink mixer in which the turning on of the water to the water motor will automatically cause a rod to descend into the receptacle holding the drink, the rod being simultaneously rotated to produce an agitation of the contents and a thorough mixing of the drink.

A further object of my invention is to provide a novel form of water motor which is very simple in construction, and yet which is positive in action.

Other objects and advantages will appear in the following specification, and the novel features of the invention will be particularly pointed out in the appended claims.

My invention is illustrated in the accompanying drawings, forming part of this application, in which—

Figure 1 is a vertical sectional view through the device,

Fig. 2 is a front view,

Fig. 3 is a section along the line 3—3 of Fig. 1,

Fig. 4 is a section along the line 4—4 of Fig. 1.

In carrying out my invention, I provide a base 1 of any suitable material. Arranged to pass through the base is a pipe 2 which serves the double purpose of being a support for the major portion of the mechanism, and also as a discharge pipe, as will be shown later. The upper part of the pipe 2 enters into the motor casing 4. The latter, it will be observed, has integral sides 5. A portion of the casing is in cylindrical form, as shown in Fig. 3, an extension 6 being provided.

The rotor consists of a circular disk 7 of smaller diameter than the circular portion of the casing to provide a passageway 8 between the disk and the casing. The disk is provided at opposite sides with extensions 9 which are arranged to fit closely against the inner faces of the sides 5. At 10 the casing is cut away to provide room for a valve 11 of the shape shown in Fig. 3, this valve being arranged to engage the edge of the rotor 7, and being adapted to swing into the recess 10 out of the way of the extensions 9 as the latter are moved around.

In order to propel the motor, I provide an intake pipe 12 which extends upwardly through the main pipe 2, and communicates with the interior of the casing by means of a pipe 13. In Fig. 3, it will be seen that this pipe 13 enters the casing near the valve 11.

The casing is provided with a cover plate 14 which is secured to the sides 5 by screws 15, or in any other suitable manner. The plate is provided with a sleeve 16 arranged to receive the screw cap 17. Arranged to pass through the screw cap 17, the sleeve 16, the rotor 7, and through the stuffing box 18, at the bottom of the casing is a shaft 19, bearing at its lower end agitators 20 which, in the present instance, may be thin hexagonal nuts soldered or otherwise permanently secured upon the shaft. It will be understood that the shaft is movable vertically. Its upper end bears outwardly extending arms 21, to which are pivotally connected links 22. These in turn are pivotally connected at 23 to links 24, the lower ends of the links 24 being pivotally connected to the screw cap 17. At the pivotal connections 23 of the links 22 with the links 24, I secure hemispherical weights 25, there being four of these weights. An ornamental cover 26 is disposed about the upper end of the device, while a valve wheel 27 is provided for the purpose of controlling the flow of water through the intake pipe 12.

From the foregoing description of the various parts of the device, the operation thereof may be readily understood. The receptacle or cup 28 containing the drink is placed on the base 1 underneath the agitators 20 and the hand wheel 27 is operated to admit water to the water motor. Any suitable valve may be used in connection with the hand wheel 27 to control the pipe 12. The water enters the casing through the pipe 13, and forces the valve 11 against the outer surface of the rotor. Meeting the extension or abutment 9, it moves the latter, and hence the rotor in the direction shown by the arrow in Fig. 3. The shaft 19 is feathered to the rotor so as to revolve with it, the shaft, however, being slidable with respect to the rotor, as heretofore stated. The revolution of the shaft causes the links 22 and 24 to assume the position shown in the dotted lines, owing to the centrifugal action which is assisted by weights 25. The shaft thereupon descends until the agitators 21 are in the receptacle 28, and the contents of each are thoroughly mixed by the rotation of the agitators. The water is discharged from the water motor through the pipe 2, which is connected with any suitable drain, not shown. When the water is turned off, the rotor stops and the links 22 are thereupon forced together by any suitable means, such as a spring 30. This causes the shaft 19 to rise so as to lift the agitators out of the way of the receptacle, which may then be removed. If desired, the sleeve 16 may be provided with packing material, so that there is no danger of the water leaking either through the bottom or the top of the casing.

I am aware that other forms of the device based on the same principle might be made, but I consider as my own any modifications which fall within the scope of the appended claims.

I claim:

1. A drink mixer comprising a base, an upright carried thereby, a motor, a vertically extending shaft provided with agitators at its lower end, said shaft being driven by said motor, and centrifugal means for causing a downward movement of the shaft during the rotation thereof.

2. A drink mixer comprising a base, a pipe secured to said base, a motor casing carried by the pipe, a rotor within said casing, an intake pipe disposed in said first named pipe and arranged to conduct water into said casing, a vertically extending shaft arranged to be rotated by said motor, centrifugal means for moving the shaft longitudinally when the shaft is revolving, and agitators carried by the shaft at the lower end thereof.

3. A drink mixer comprising a base, a pipe carried by the base, a casing carried by said pipe, a rotor within said casing, said rotor having extensions or abutments arranged to engage the walls of the casing, a valve carried by the casing and arranged to engage the rotor for causing a flow of water between the rotor and the casing in one direction, a shaft driven by said rotor and slidable through the rotor and the casing, and centrifugal means connected with said shaft for causing a downward movement of the latter when the shaft is rotating.

4. A drink mixer comprising a base, a motor, a vertically extending shaft provided with agitators at its lower end, said shaft being driven by said motor, means for supplying a motive fluid to said motor, centrifugal means actuated by the rotation of the shaft for causing a downward movement thereof during the rotation of the shaft, a hollow upright carried by said base, said upright constituting a support for the motor casing and a discharge pipe for the motive fluid.

5. A drink mixer comprising a base, a pipe carried by the base, a casing carried by said pipe, a rotor within said casing, said rotor having extensions or abutments arranged to engage the walls of the casing, a valve carried by the casing and arranged to engage the rotor for causing a flow of water between the rotor and the casing in one direction, a shaft driven by said rotor and slidable through the rotor and the casing, centrifugal means connected with said shaft for causing a downward movement of the latter when the shaft is rotating, and stuffing boxes carried by the casing at the top and bottom thereof for preventing the leakage of water from said casing.

6. In a drink mixer, a water motor comprising a casing, a rotatable disk disposed within the casing, the edges of the disk being spaced from the walls of the casing to provide a passageway, an extension carried by the disk and arranged to engage the walls of the casing, and a pivoted abutment valve disposed within the casing and arranged to bear on the edge of said rotatable disk for preventing a backward flow of water.

7. In a drink mixer, a water motor comprising a casing, a rotatable disk disposed within the casing, the edges of the disk being spaced from the walls of the casing to provide a passageway, an extension carried by the disk and arranged to engage the walls of the casing, a pivoted abutment valve disposed within the casing and arranged to bear on the edge of said rotatable disk for preventing a backward flow of water, said valve being engaged and moved aside by said extension, and a pipe for supporting the casing and for receiving the water discharged therefrom.

CHARLES VOGT.